US010510074B1

(12) United States Patent
Rule et al.

(10) Patent No.: US 10,510,074 B1
(45) Date of Patent: Dec. 17, 2019

(54) ONE-TAP PAYMENT USING A CONTACTLESS CARD

(71) Applicant: Capital One Services, LLC, McLean, VA (US)

(72) Inventors: Jeffrey Rule, McLean, VA (US); Paul Moreton, McLean, VA (US); Lea Cody, McLean, VA (US); Colin Hart, McLean, VA (US); Wayne Lutz, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/265,974

(22) Filed: Feb. 1, 2019

(51) Int. Cl.
G06Q 20/40 (2012.01)
G06Q 20/38 (2012.01)
G06Q 20/34 (2012.01)

(52) U.S. Cl.
CPC ......... *G06Q 20/385* (2013.01); *G06Q 20/352* (2013.01); *G06Q 20/3829* (2013.01); *G06Q 20/409* (2013.01); *G06Q 20/4018* (2013.01)

(58) Field of Classification Search
None
See application file for complete search history.

(56) References Cited

U.S. PATENT DOCUMENTS

| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |

(Continued)

FOREIGN PATENT DOCUMENTS

| CA | 3010336 A1 | 7/2017 |
| CN | 101192295 A | 6/2008 |

(Continued)

OTHER PUBLICATIONS

Author unknown: "onetappayment™", [online] Jan. 24, 2019, [retrieved on Jan. 24, 2019]. Retrieved from Internet URL: https://www.payubiz.in/onetap, 4 pages.

(Continued)

*Primary Examiner* — Steven S Kim
*Assistant Examiner* — Jason B Fenstermacher

(57) ABSTRACT

One-tap payment using a contactless card. An application may output an indication specifying to tap a contactless card to complete a transaction initiated in the application. The application may receive encrypted data generated by the contactless card based on a private key stored in the contactless card. The application may transmit a merchant identifier, a transaction identifier, and the encrypted data to an authentication server. The authentication server may verify the encrypted data based on the private key for the contactless card stored by the authentication server. A virtual account number server may generate a virtual account number. A merchant server may receive the merchant identifier, the transaction identifier, the virtual account number, an expiration date, and a card verification value (CVV), and process the transaction using the transaction identifier, the virtual account number, the expiration date, and the CVV.

18 Claims, 10 Drawing Sheets

(56) References Cited

U.S. PATENT DOCUMENTS

| | | |
|---|---|---|
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haab |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |

(56) References Cited

U.S. PATENT DOCUMENTS

| | | |
|---|---|---|
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |

(56) References Cited

U.S. PATENT DOCUMENTS

| | | |
|---|---|---|
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2009/0292642 A1* | 11/2009 | Han .................. G06Q 20/12 705/71 |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054336 A1* | 2/2013 | Graylin .................. H04L 67/02 705/14.26 |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0012688 A1* | 1/2014 | McGuinness .......... G06Q 20/40 705/16 |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0088757 A1 | 3/2015 | Zhou et al. |
| 2015/0089586 A1 | 3/2015 | Ballesteros |
| 2015/0134452 A1 | 5/2015 | Williams |

(56) References Cited

U.S. PATENT DOCUMENTS

| | | |
|---|---|---|
| 2015/0140960 A1 | 5/2015 | Powell et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1* | 10/2015 | Malek ............... G06Q 20/3224 705/44 |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1* | 12/2016 | Hammad ............... G06F 21/34 705/75 |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1* | 5/2017 | Moghadam ............ G06Q 40/04 |
| 2017/0140379 A1 | 5/2017 | Deck |
| 2017/0154328 A1 | 6/2017 | Zarakas et al. |
| 2017/0154333 A1* | 6/2017 | Gleeson ............. G06Q 20/3829 |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0066069 A1* | 2/2019 | Faith ...................... G06Q 20/10 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1469419 A1 | 10/2004 |
| EP | 1783919 A1 | 5/2007 |
| EP | 2139196 A1 | 12/2009 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Batina, Lejla and Poll, Erik, "SmartCards and RFID", Course PowerPoint Presentation for IPA Security Course, Digital Security at University of Nijmegen, Netherlands (date unknown) 75 pages.

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016

(56) References Cited

OTHER PUBLICATIONS

[retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big-Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.I, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieeved from Internet URL: https://www.securetechalliance.org/resources/media/scap13_preconference/02.pdf, 37 pages.

Pierce, Kevin, "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007), 16 pages.

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Vu et al., (2012). "Distinguishing users with capacitive touch communication" Proceedings of the Annual International Conference on Mobile Computing and Networking, MOBICOM. 10.1145/2348543.2348569, 12 pages.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC", Annex Cloud [online] May 19, 2017 [retrieved on Jul. 3, 2019]. Retrieved from Internet URL: https://www.annexcloude.com/blog/benefits-unified-platform/, 13 pages.

\* cited by examiner

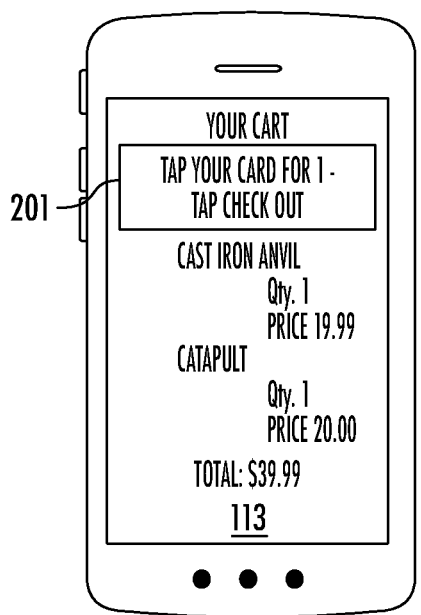
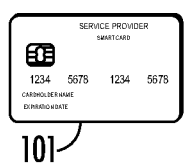
FIG. 2A
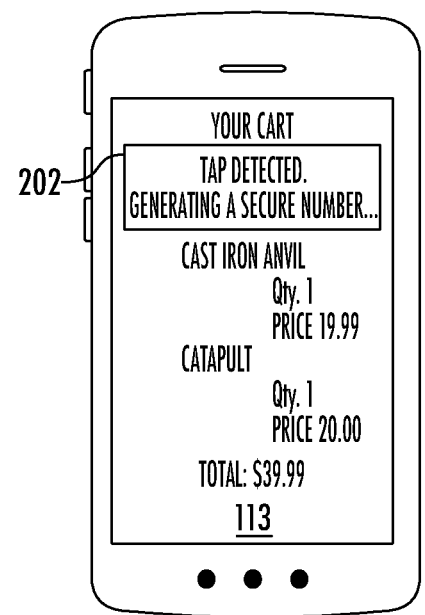
FIG. 2B

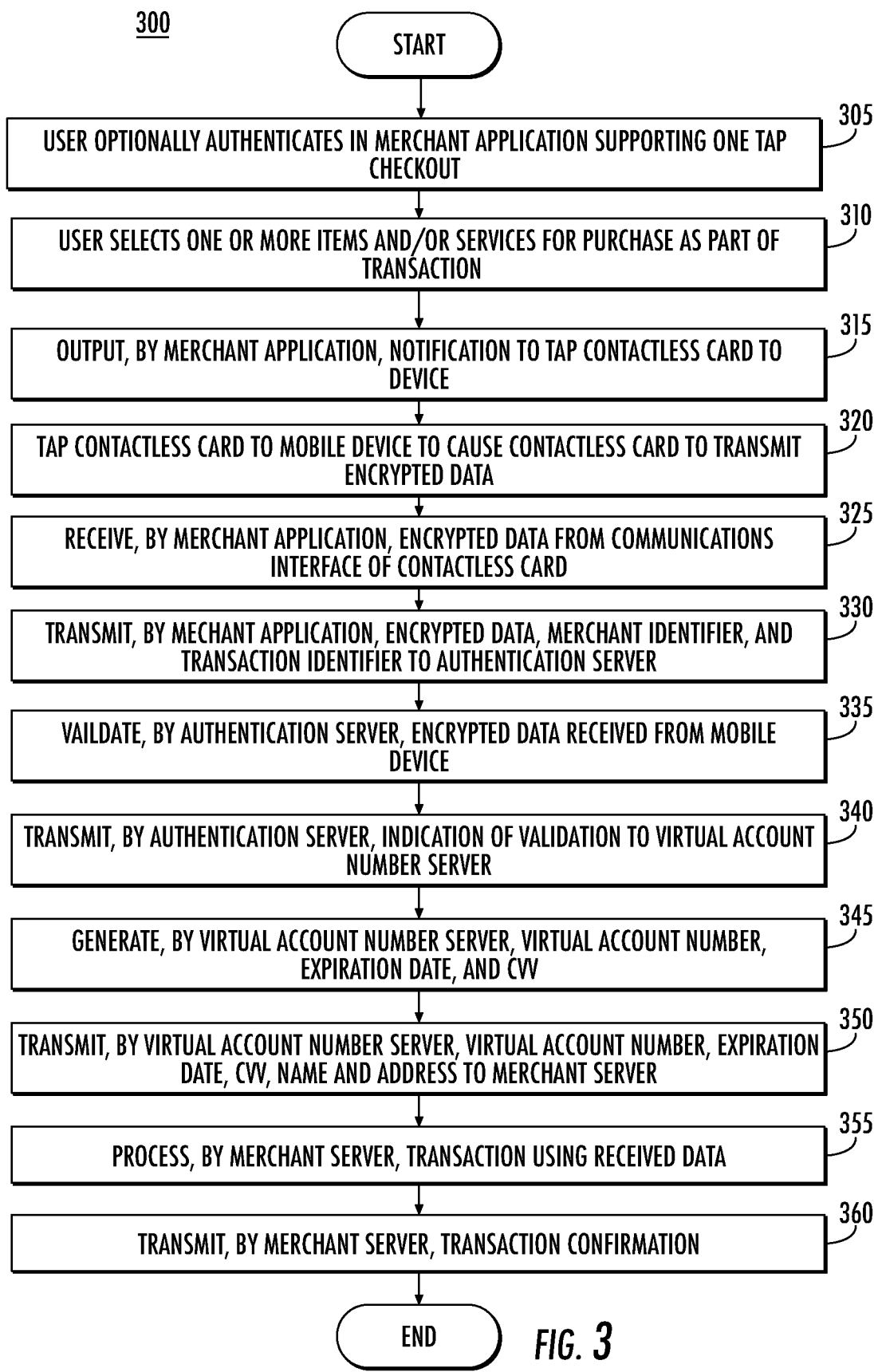

US 10,510,074 B1

ONE-TAP PAYMENT USING A CONTACTLESS CARD

TECHNICAL FIELD

Embodiments herein generally relate to computing platforms, and more specifically, to tapping a contactless card to a computing device to perform one-tap payment.

BACKGROUND

Users often complete transactions using online software platforms. Conventionally, users must manually enter all relevant payment information in the online software platform to complete a transaction. However, users often make mistakes when entering their payment information. Furthermore, transmitting payment information via a user device may pose security risks.

SUMMARY

Embodiments disclosed herein provide systems, methods, articles of manufacture, and computer-readable media for tapping a contactless card to a computing device for one-tap payment. In one example, an application may output an indication specifying to tap a contactless card to complete a transaction initiated in the application. The application may receive encrypted data generated by the contactless card based on a private key stored in the contactless card. The application may transmit a merchant identifier, a transaction identifier, and the encrypted data to an authentication server. The authentication server may verify the encrypted data based on the private key for the contactless card stored by the authentication server. A virtual account number server may generate a virtual account number. A merchant server may receive the merchant identifier, the transaction identifier, the virtual account number, an expiration date, and a card verification value (CVV). The merchant server may process the transaction using the transaction identifier, the virtual account number, the expiration date, and the CVV.

BRIEF DESCRIPTION OF THE DRAWINGS

FIGS. 2A-2D illustrate embodiments of tapping a contactless card to a computing device for one-tap payment.

FIG. 3 illustrates an embodiment of a first logic flow.

DETAILED DESCRIPTION

Figure 1A:
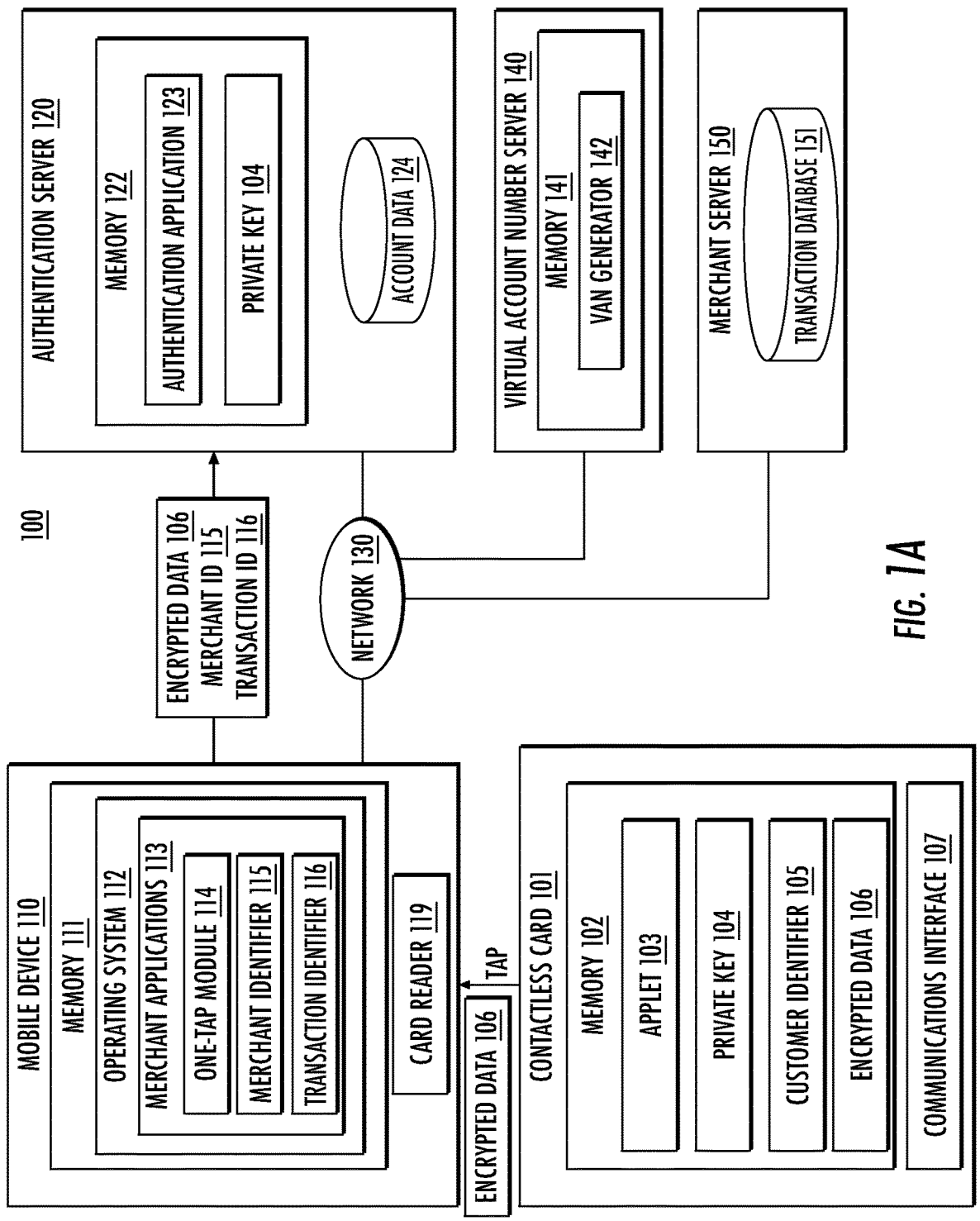
FIGS. 1A-1C illustrate embodiments of a system to tap a contactless card to a computing device for one-tap payment.

Embodiments disclosed herein provide secure techniques to use a contactless card for one-tap payment. For example, when using a merchant application executing on a computing device, a user may select one or more items for purchase. The user may then tap their contactless card to the computing device, which may cause the contactless card to come within communications range of the computing device. Doing so causes the contactless card to generate encrypted data which is transmitted to the computing device. The merchant application may receive the encrypted data generated by the contactless card and transmit the encrypted data to an authentication server for validation. The merchant application may further transmit an indication of a merchant identifier and/or a transaction identifier with the encrypted data. Once validated, the authentication server may instruct a virtual account number server to generate card data for the account associated with the contactless card. The card data may include a virtual account number, an expiration date, and a card verification value (CVV). A virtual account number may be an account number that is different than the account number associated with the contactless card. The generated card data may then be transmitted with the merchant identifier and the transaction identifier to a merchant server associated with the merchant. The virtual account number server and/or the authentication server may also provide a name of the user, a billing address of the user, and/or a shipping address of the user to the merchant server. The merchant server may then complete the transaction using the received data. The merchant server may then transmit a confirmation to the computing device which is outputted for display by the merchant application to the user. From the point of view of the user of the computing device, once the card is tapped to the computing device, the transaction is completed without requiring additional user input, and the user receives a positive confirmation message reflecting that the transaction has been completed.

Advantageously, embodiments disclosed herein improve the security of all devices and associated data. For example, by transmitting card data between secure servers, the risks associated with storing data on a user device and transmitting the data using the user device are avoided. Furthermore, conventional approaches require the user to manually enter card data into a form. However, doing so may allow other users or devices to capture the card data as the user enters the card data into the form. By eliminating the need for the user to manually enter card data, the security of the card data is enhanced. However, doing so may allow other users or devices to capture the card data as the user enters the card data into the form. By eliminating the need for the user to manually enter card data into the form, the security of the card data is enhanced. Furthermore, the validation performed by the authentication server provides an additional safeguard to ensure that the correct card data is being entered into the form. Additionally, the generation and filling of virtual card numbers into the form protects the security of the actual account number of the contactless card, as conventional solutions require providing the actual account number of the contactless card into the form.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, an authentication server 120, a virtual account number server 140, and one or more merchant servers 150. The contactless cards 101 are representative of any type of payment cards, such as a credit card, debit card, ATM card, gift card, and the like. The contactless cards 101 may comprise one or more communications interfaces 107, such as a radio frequency identification (RFID) chip, configured to communicate with the mobile devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The servers 120, 140, 150 are representative of any type of computing device, such as a server, workstation, compute cluster, cloud computing platform, virtualized computing system, and the like.

As shown, a memory 111 of the mobile device 110 includes an instance of an operating system (OS) 112. Example operating systems 112 include the Android® OS, iOS®, Linux®, and Windows® operating systems. As shown, the OS 112 includes one or more merchant applications 113. The merchant applications 113 are representative of any type of application where a user may provide payment information to complete a transaction. For example, the merchant applications 113 may allow the users to select and purchase goods, products, and/or services. In one embodiment, the merchant applications 113 may be web-based applications that are accessed using a web browser (not pictured). For example, in web-based applications, the web browser may access a website of the merchant and/or progressive web applications provided by the merchant.

As shown, the merchant applications 113 include a one-tap module 114, a merchant identifier 115, and a transaction identifier 116. As described in greater detail herein, the one-tap module 114 is software, hardware, and/or a combination of software and hardware that allows users to pay for transactions initiated in the merchant applications 113 using a single tap of the contactless card 101 to the mobile device 110. The merchant identifier 115 is a unique identifier associated with a merchant and/or a merchant server 150 associated with the merchant. The transaction identifier 116 uniquely identifies a given transaction. For example, the transaction identifier 116 may be a unique alphanumeric identifier, a unique session alphanumeric identifier, a file, etc. The transaction identifier 116 may be generated by the corresponding merchant server 150 and transmitted to the merchant application 113 and/or generated by the merchant application 113 and transmitted to the corresponding merchant server 150.

Generally, a user may use the merchant application 113 (and/or a merchant website in embodiments where the application 113 is a web browser) to select one or more items and/or services for purchase. When the user has selected the desired items and/or services, the user may encounter an interface for completing the transaction (e.g., a cart page, a checkout page, etc.) in the merchant application 113. Conventionally, the user is required to manually enter their name, card number, expiration date, CVV, and/or address information into the merchant application 113 to complete the purchase. Furthermore, conventional solutions may require the user to log into their account in the merchant application 113 (e.g., using a login/password, biometric credentials, etc.). Advantageously, however, the one-tap module 114 may facilitate one-tap checkout (e.g., payment) using the contactless card 101, regardless of whether the user has logged into their account in the merchant application 113. Generally, the one-tap module 114 may output a notification in the interface for completing the transaction. The notification may instruct the user to tap the contactless card 101 to the mobile device 110, thereby bringing the contactless card 101 sufficiently close to the card reader 119 of the mobile device 110 to enable data transfer (e.g., NFC data transfer, Bluetooth data transfer, etc.) between the communications interface 107 of the contactless card 101 and the card reader 119 of the mobile device 110. In some embodiments, the mobile device 110 may trigger the card reader 119 via an application program interface (API) call. In one example, the mobile device 110 triggers the card reader via an API call responsive to the user tapping or otherwise selecting an element of the user interface, such as a form field. In addition and/or alternatively, the mobile device 110 may trigger the card reader 119 based on periodically polling the card reader 119. More generally, the mobile device 110 may trigger the card reader 119 to engage in communications using any feasible method.

After communication has been established between mobile device 110 and contactless card 101, the applet 103 executing on a processor (not pictured) of the contactless card 101 generates and transmits encrypted data 106 to the mobile device 110 via the communications interface 107. For example, the applet 103 of the contactless card 101 may use a cryptographic algorithm to generate a cryptographic payload of encrypted data 106 based at least in part on the private key 104 stored in the memory 102 of the contactless card 101. In such an embodiment, the private key 104 and some other piece of data (e.g., the customer identifier 105, an account identifier, etc.) may be provided as the input to the cryptographic algorithm, which outputs the encrypted data 106. Generally, the applet 103 may use any type of cryptographic algorithm and/or system to generate the encrypted data 106, and the use of a specific cryptographic algorithm as an example herein should not be considered limiting of the disclosure. In some embodiments, the applet 103 may perform encryption using a key diversification technique to generate the encrypted data 106. Examples of key diversification techniques are described in U.S. patent application Ser. No. 16/205,119, filed Nov. 29, 2018. The aforementioned patent application is incorporated by reference herein in its entirety.

Once generated, the applet 103 may transmit the encrypted data 106 to the one-tap module 114 of the mobile device 110, e.g., via NFC. In some embodiments, the one-tap module 114 may require the user to log into their account in the account data 124 associated with the contactless card 101 (e.g., provide a login/password and/or biometric credentials). The one-tap module 114 may transmit the encrypted data 106, the merchant identifier 115, and the transaction identifier 116 to the authentication application 123 of the authentication server 120. In some embodiments, the one-tap module 114 may transmit additional data describing the mobile device 110, such as a software fingerprint of the mobile device 110, location (e.g., global positioning system (GPS)) data of the mobile device 110, a unique identifier of the mobile device 110, etc.

Once received, the authentication application 123 may then authenticate the encrypted data 106. For example, the authentication application 123 may attempt to decrypt the encrypted data 106 using a copy of the private key 104 stored in the memory 122 of the authentication server 120. The private key 104 may be identical to the private key 104 stored in the memory 102 of the contactless card 101, where each contactless card 101 is manufactured to include a unique private key 104 (and the authentication server 120 stores a corresponding copy of each unique private key 104). Therefore, the authentication application 123 may successfully decrypt the encrypted data 106, thereby verifying the encrypted data 106. Although the private key 104 is depicted as being stored in the memory 122, the private key 104 may be stored elsewhere, such as in a secure element and/or a hardware security module (HSM). In such embodiments, the secure element and/or the HSM may decrypt the encrypted data 106 using the private key 104 and a cryptographic function.

For example, as stated, the customer identifier 105 may be used to generate the encrypted data 106. In such an example, the authentication application 123 may decrypt the encrypted data 106 using the private key 104 of the authentication server 120. If the result of the decryption yields the customer identifier 105 associated with the account in the account data 124, the authentication application 123 verifies the encrypted data 106 and instructs the VAN generator 142 to generate virtual card data for the account associated with the contactless card 101. If the authentication application 123 is unable to decrypt the encrypted data to yield the expected result (e.g., the customer identifier 105 of the account associated with the contactless card 101), the authentication application 123 does not validate the encrypted data 106. Due to the failed verification, the authentication application 123 does not instruct the VAN generator 142 to generate virtual card data to preserve the security of the associated account.

In some embodiments, the authentication application 123 processes the additional data received from the mobile device 110 as a condition to instructing the VAN generator 142 to generate the virtual card data. Some such embodiments include where the user is not logged into the merchant account and/or the account in the account data 124. For example, the authentication application 123 may determine whether the device identifier of the mobile device 110 is specified as a known device identifier for the associated account in the account data 124. If the device identifier is not a known identifier, the authentication application 123 may refrain from instructing the VAN generator 142 to generate the virtual card data. Otherwise, the authentication application 123 may instruct the VAN generator 142 to generate the virtual card data. As another example, the authentication application 123 may determine whether the software fingerprint matches a known software fingerprint for the associated account in the account data 124. If the software fingerprint is not a known software fingerprint, the authentication application 123 may refrain from instructing the VAN generator 142 to generate the virtual card data. Otherwise, the authentication application 123 may instruct the VAN generator 142 to generate the virtual card data. As yet another example, the authentication application 123 may determine whether the GPS coordinates indicate the user is at home, at work, or some other known address associated with the account in the account data 124. If the location of the device is not within a threshold distance of the known address, the authentication application 123 may refrain from instructing the VAN generator 142 to generate the virtual card data. Otherwise, the authentication application 123 may instruct the VAN generator 142 to generate the virtual card data. Further still, the authentication application 123 may determine whether the user has previously made purchases with the merchant associated with the received merchant identifier 115. If the user has not made a previous purchase with the merchant, the authentication application 123 may refrain from instructing the VAN generator 142 to generate the virtual card data. Otherwise, the authentication application 123 may instruct the VAN generator 142 to generate the virtual card data.

Figure 1B:
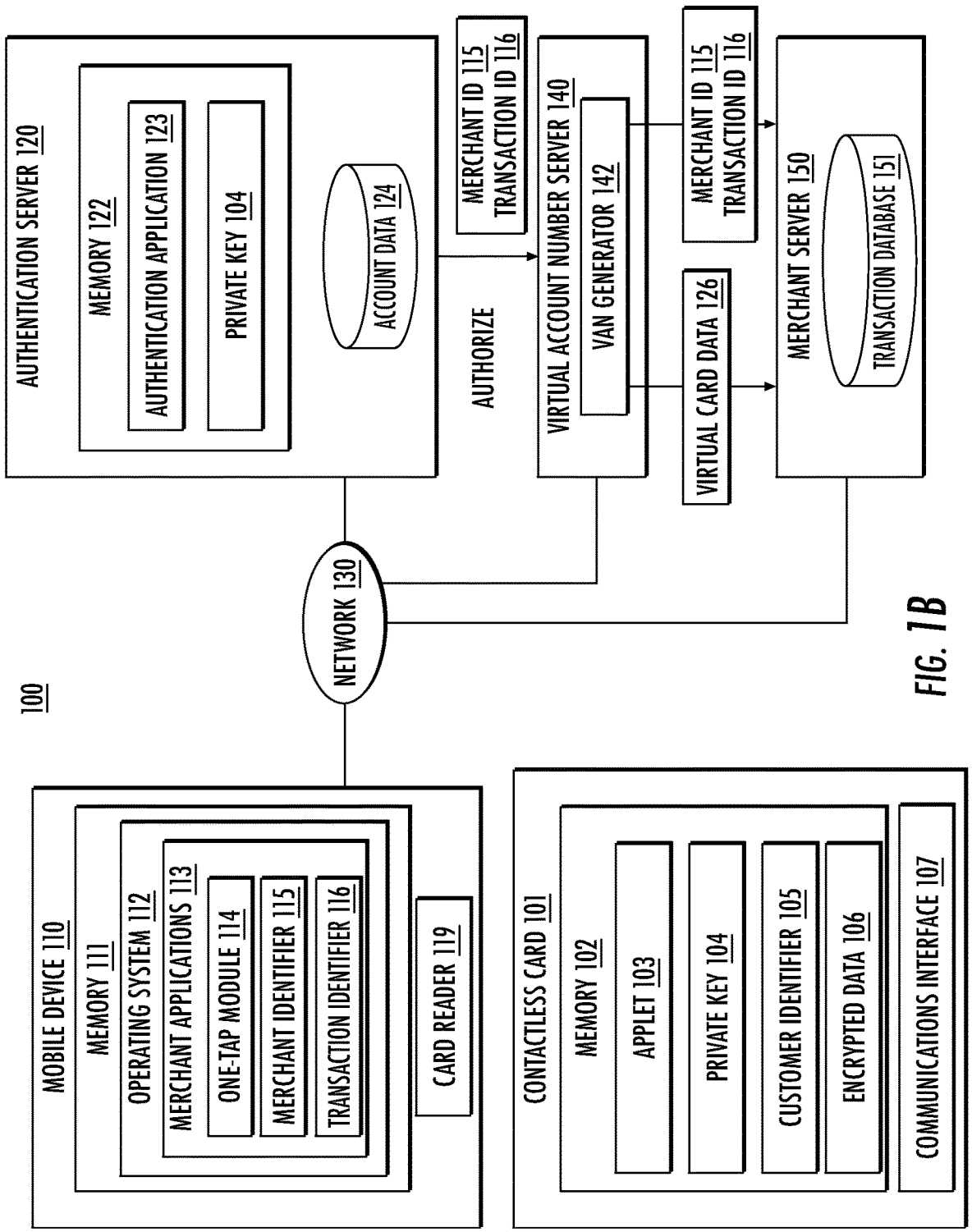

FIG. 1B depicts an embodiment where the authentication application 123 validates the encrypted data 106 and instructs the virtual account number (VAN) generator 142 in the memory 141 of the virtual account number server 140 to generate virtual card data 126 comprising a virtual account number, expiration date, and CVV for the account associated with the contactless card 101. In some embodiments, the VAN generator 142 generates the virtual account number, the expiration date, and the CVV. In other embodiments, the VAN generator 142 generates the virtual account number and selects an existing expiration date and/or CVV (e.g., from the account data 124). For example, the existing expiration date and/or CVV may be the expiration date and/or CVV of the contactless card 101, or another card associated with the account in the account data 124. The VAN generator 142 may further receive the name of the account holder and one or more known addresses (e.g., a billing address, shipping address, etc.) from the account in the account data 124 associated with the contactless card 101. In at least one embodiment, the card data 126 including the virtual account number generated by the VAN generator 142 is restricted to the merchant associated with the merchant identifier 115. The virtual account number and/or card data 126 may further include other restrictions (e.g., time restrictions, amount restrictions, etc.). Once generated, the VAN generator 142 may transmit the virtual card data 126, the merchant identifier 115, and the transaction identifier 116 to the merchant server 150. The VAN generator 142 and/or the authentication server 120 may further transmit the name of the account holder, the billing address, and the shipping address to the merchant server 150. In one embodiment, the VAN generator 142 determines a location of the merchant server 150 based on the merchant identifier 115 (e.g., in a lookup table associating merchant identifiers 115 with a corresponding merchant server 150).

Figure 1C:
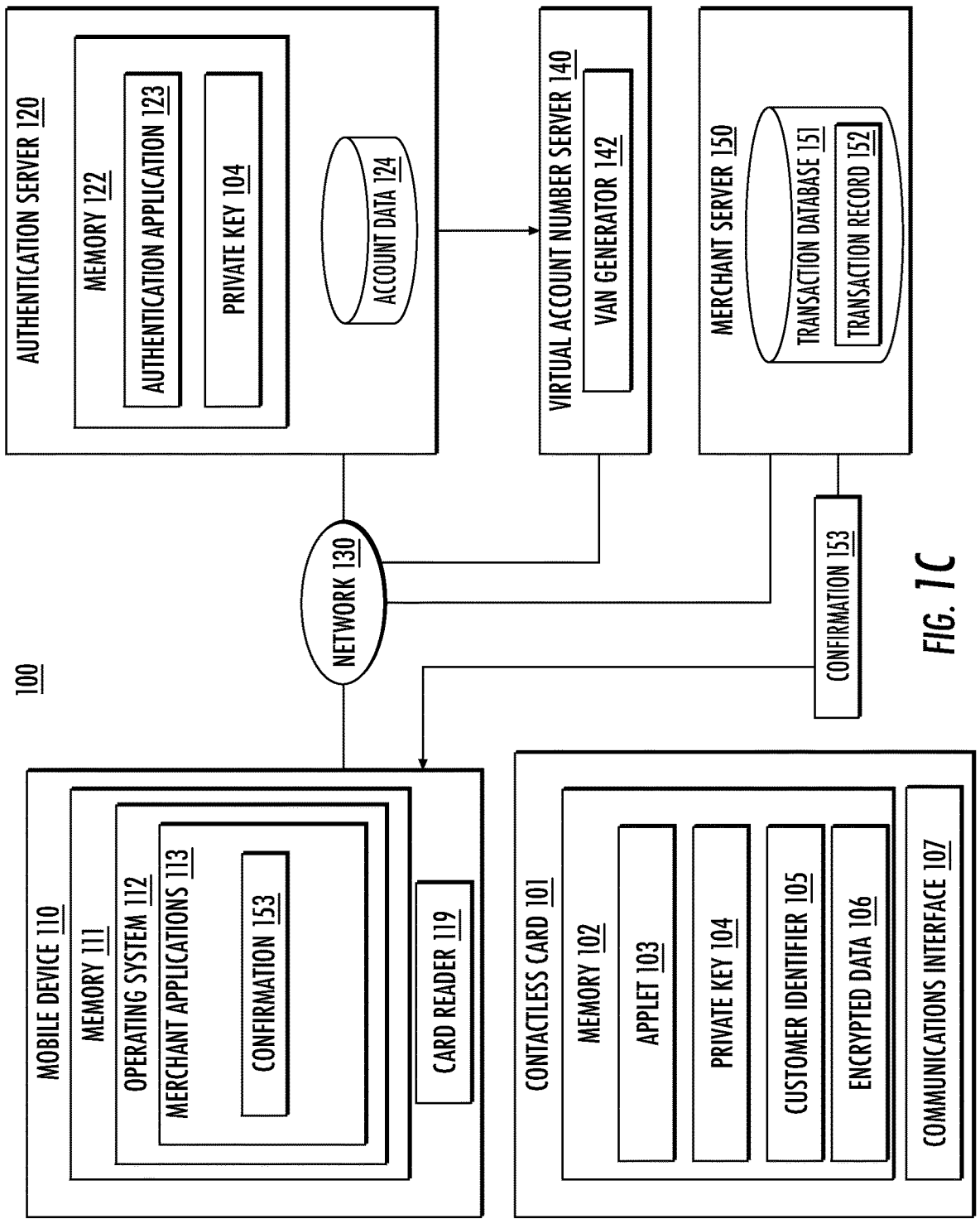

FIG. 1C depicts an embodiment where the merchant server 150 receives the virtual card data 126, the merchant identifier 115, the transaction identifier 116, and any other data (e.g., the account holder's name and addresses) from the VAN generator 142 and/or the authentication server 120. Generally, the merchant server 150 may process the transaction using the data received from the VAN generator 142 and/or the authentication server 120. More specifically, the merchant server 150 may generate a transaction record 152 in the transaction database 151 using the received virtual account number, expiration date, CVV, name, and/or addresses. The transaction record 152 in the transaction database 151 may further specify the transaction identifier 116. Doing so uses the virtual card data 126 to pay for the transaction without requiring the user to input any payment information using the merchant application 113 executing on the mobile device 110. Instead, the transaction is paid for and processed using the securely generated and transmitted virtual card data 126.

As shown, the merchant server 150 may generate a confirmation 153 indicating that payment for the transaction was received and the transaction has been processed. The merchant server 150 may transmit the confirmation 153 to the merchant application 113, which may output the confirmation 153 on a display of the mobile device 110. In other embodiments, the confirmation 153 may be an email confirmation, text message confirmation, push notification, etc. Doing so informs the user that the transaction has been completed and may include additional information regarding the delivery of items, rendering of services, etc.

FIG. 2A is a schematic 200 depicting an example embodiment of tapping the contactless card 101 for one-tap payment. As shown, the merchant application 113 executing on the mobile device 110 displays a graphical user interface (GUI) to complete a purchase. For example, the GUI may be a shopping cart page, checkout page, or any other page of the merchant application 113. As shown, a notification 201 instructs a user to tap the contactless card 101 to the mobile device 110 to pay for the items in their shopping cart using one-tap payment. Once the tap is detected, as shown in the schematic 210 of FIG. 2B, the merchant application 113 may output a notification 202 indicating that a secure virtual number is being generated.

Figures 2C, 2D:
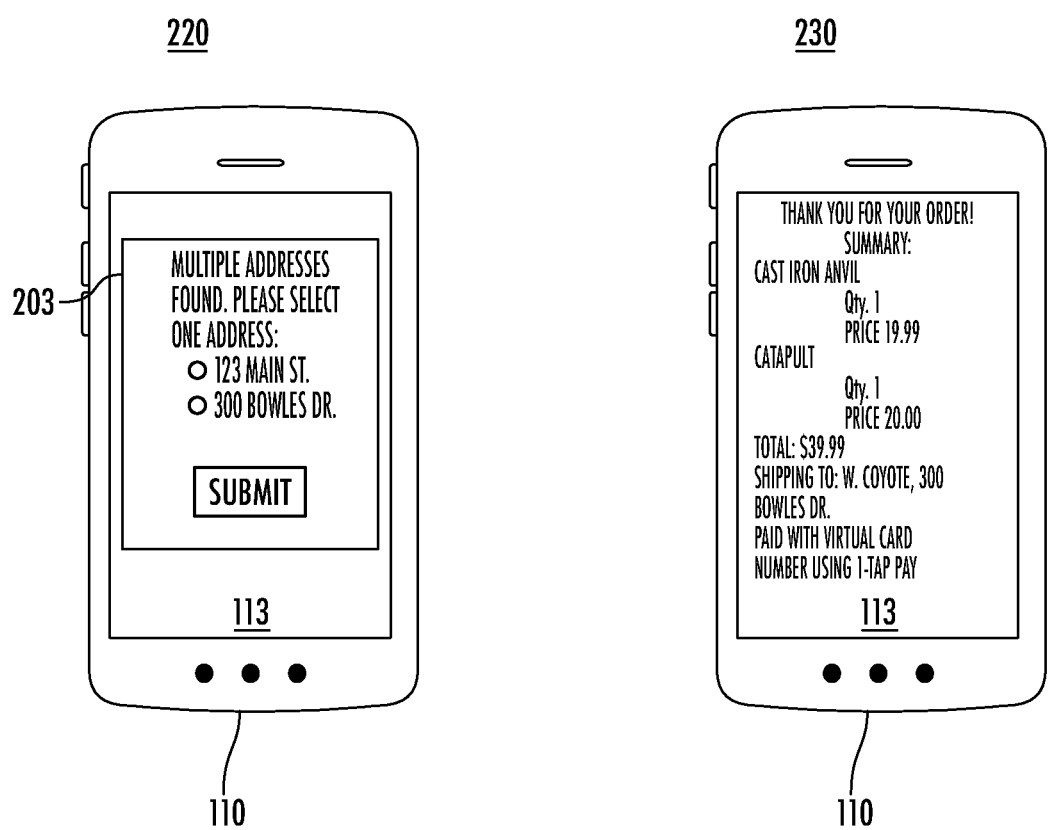

As stated, once the user taps the contactless card 101 to the mobile device 110, the contactless card 101 generates the encrypted data 106 and transmits the encrypted data 106 to the mobile device 110. Once received, the one-tap module 114 transmits the encrypted data 106, merchant ID 115, and transaction ID 116 to the authentication server 120. The authentication application 123 may then verify the encrypted data 106 by decrypting the encrypted data 106 with the private key 104 stored in the memory 122 of the server 120. Once verified, the authentication application 123 instructs the VAN generator 142 to generate the virtual card data 126 (e.g., a virtual card number, expiration date, and/or CVV). As stated, in some embodiments, the VAN generator 142 may generate the virtual card number and retrieve the expiration date and/or CVV from the account data 124. The VAN generator 142 may also receive the merchant ID 115, the transaction ID 116, and additional data describing the user (e.g., names, billing address, shipping address, etc.) from the account data 124. The VAN generator 142 may then transmit the virtual card data 126, the merchant ID 115, transaction ID 116, and any usernames and/or addresses to the merchant server 150. The merchant server 150 may then process the transaction using the data received from the VAN generator 142, e.g., by generating a transaction record 152 in the transaction database 151 using at least the received virtual card number, expiration date, CVV. The transaction record 152 may further include the user's name, billing address, shipping address, and an indication of each item and/or service purchased. The merchant server 150 may then transmit an order confirmation to the mobile device 110. FIG. 2D is a schematic 230 depicting an example confirmation outputted by the merchant application 113 on the mobile device 110.

In some embodiments, the merchant server 150 may require resolution of data conflicts before processing the transaction using the data received from the VAN generator 142. For example, the account data 124 may specify a billing address of "123 Main St." for the user's account, whereas the user's profile in the merchant server 150 may specify "300 Bowles Dr." as the billing address of the user's account. Therefore, as depicted in the schematic 220 of FIG. 2C, the merchant server 150 may cause the merchant application 113 to output the notification 203 on the mobile device 110. As shown, the notification 203 allows the user to select one of the two different addresses. Once selected, the merchant application 113 transmits an indication of the selected address to the merchant server 150. The merchant server 150 may then process the transaction using the selected address. Although an address is used as an example, the merchant server 150 and/or the merchant application 113 may similarly resolve data conflicts for other data types (e.g., names, shipping addresses, etc.).

FIG. 3 illustrates an embodiment of a logic flow 300. The logic flow 300 may be representative of some or all of the operations executed by one or more embodiments described herein. For example, the logic flow 300 may include some or all of the operations to use a contactless card to perform one-tap payment. Embodiments are not limited in this context.

As shown, the logic flow 300 begins at block 305, where a user optionally provides authentication credentials to authenticate a user account in the merchant application 113, where the merchant application 113 includes the one-tap module 114 for supporting one-tap checkout as described herein. However, as stated, in some embodiments, the user may not authenticate into their account with the merchant application 113. At block 310, the user may select one or more items and/or services to purchase as part of a transaction. For example, the user may specify to request a car service to drive them from their home to the airport. As another example, the user may specify to order food items for delivery to their office. As stated, the merchant application 113 may be associated with a unique merchant ID 115. Similarly, the user's selected items and/or services may be associated with a transaction ID 116. As the user selects and/or removes items and/or services from their shopping cart, the merchant application 113 may transmit an indication of the transaction ID 116 and the selected and/or removed items to the merchant server 150, thereby allowing the merchant server 150 to be aware of what items and/or services are associated with a given transaction ID 116. At block 315, the one-tap module 114 of the merchant application 113 outputs a notification specifying to tap a contactless card 101 to the mobile device 110. In one embodiment, the one-tap module 114 outputs the notification upon determining the merchant application 113 outputs an element (e.g., a form, a form field, etc.) that is associated with completing a transaction and/or paying for a transaction.

At block 320, a user taps the contactless card 101 to the mobile device 110 to cause the contactless card 101 to generate and transmit encrypted data 106. The applet 103 of the contactless card 101 may then generate the encrypted data 106 using the private key 104, input data (e.g., the customer identifier 105), and a cryptographic algorithm. The applet 103 may then transmit the encrypted data 106 to the mobile device 110. At block 325, the one-tap module 114 and/or the merchant application 113 may receive the encrypted data 106 from the communications interface 107 of the contactless card. At block 330, the one-tap module 114 and/or the merchant application 113 transmits the encrypted data 106, merchant identifier 115, and the transaction identifier 116 to the authentication server 120.

At block 335, the authentication application 123 decrypts the encrypted data 106 using the private key 104 in the memory 122 of the authentication server 120 to validate the encrypted data 106. At block 340, the authentication application 123 transmits an indication to the VAN generator 142 specifying to generate card data comprising a virtual account number, expiration date, and CVV. The authentication application 123 may further transmit the merchant identifier 115 and/or the transaction identifier 116 to the VAN generator 142. At block 345, the VAN generator 142 generates the virtual account number, expiration date, and CVV. At block 350, the VAN generator 142 transmits the virtual account number, expiration date, CVV, merchant ID 115, and transaction ID 116 to the mobile device 110. The VAN generator 142 may further include the name, billing address, and shipping address of the account holder, which may be stored locally by the VAN generator 142 and/or received from the authentication server 120.

At block 355, the merchant server 150 processes the transaction associated with the transaction ID 116 using the data received from the VAN generator 142. More specifically, the merchant server 150 processes payment for the transaction using at least the virtual card number, expiration date, and CVV generated by the VAN generator 142. As stated, the merchant server 150 may process the transaction payment by generating a transaction record 152 in the transaction database 151 using at least the received virtual card number, expiration date, CVV. The transaction record 152 may further include the user's name, billing address, shipping address, and an indication of each item and/or service associated with the transaction ID 116. At block 360, the merchant server 150 may transmit a payment confirmation to the merchant application 113 on the mobile device. The confirmation may generally indicate that the payment has been processed using the virtual card data generated by the VAN generator.

Figure 4:
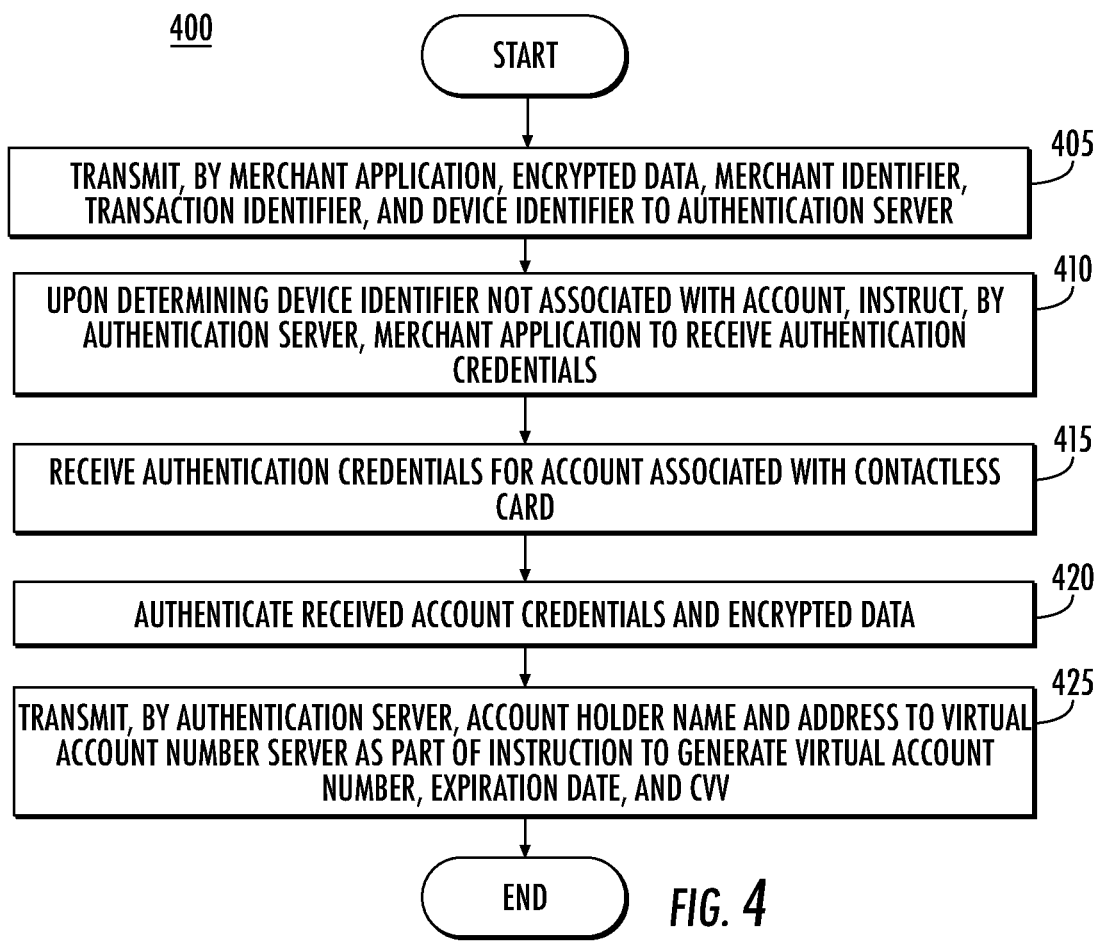
FIG. 4 illustrates an embodiment of a second logic flow.

FIG. 4 illustrates an embodiment of a logic flow 400. The logic flow 400 may be representative of some or all of the operations executed by one or more embodiments described herein. For example, the logic flow 500 may include some or all of the operations performed to authorize a one-tap payment using the contactless card 101. Embodiments are not limited in this context.

As shown, the logic flow 400 begins at block 405, where the one-tap module 114 and/or the merchant application 113 transmits the encrypted data 106 generated by the contactless card 101, the merchant ID 115, transaction ID 116, and a device identifier to the authentication server 120. As stated, the device identifier may be a software fingerprint of the mobile device 110, a unique identifier of the mobile device 110 (e.g., a medium access control (MAC) address), and the like. At block 410, the authentication application 123 may determine that the received device identifier is not associated with the account of the contactless card 101. For example, the account data 124 may include known device identifiers for a given account. If the received device identifier is not specified as a known device identifier in the account data 124, the authentication application 123 may require additional information to preserve account security. As such, the authentication application 123 may instruct the one-tap module 114 to output an indication to receive authentication credentials for the account in the account data 124. For example, the one-tap module 114 may output a notification specifying that the user provides their fingerprint as biometric input to authenticate into their account associated with the account in the account data 124. As another example, the one-tap module 114 may output a notification specifying that the user provides the login and password associated with the account in the account data 124. In other embodiments, the user may log into the account using FaceID, other biometric identifiers, or any other type of credential.

At block 415, the user provides credentials (e.g., biometric input, login/password, etc.) for the account in the account data 124 to the one-tap module 114 and/or the merchant application 113. The one-tap module 114 may include logic to verify the received credentials. In other embodiments, the one-tap module 114 may transmit the received credentials to the authentication server 120. At block 420, the authentication application 123 authenticates the received account credentials and the encrypted data 106 generated by the contactless card 101. The authentication application 123 may determine whether the received account credentials match credentials for the account stored in the account data 124 and decrypt the encrypted data 106 using the private key 104. At block 425, the authentication server 120 may determine to instruct the VAN generator 142 to generate a virtual card number, expiration date, and CVV. The authentication server 120 may further transmit, with the instruction, a name, billing address, and shipping address from the account data 124 to the VAN generator 142.

Figure 5:
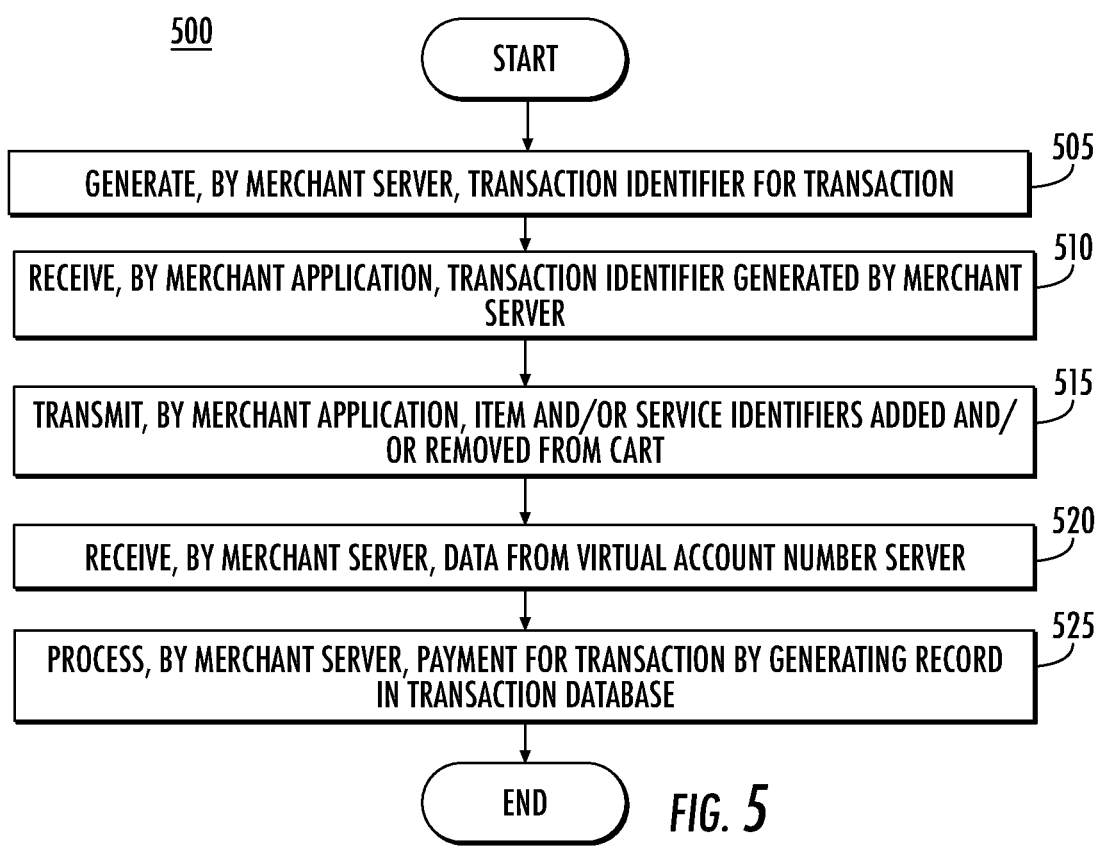
FIG. 5 illustrates an embodiment of a third logic flow.

FIG. 5 illustrates an embodiment of a logic flow 500. The logic flow 500 may be representative of some or all of the operations executed by one or more embodiments described herein. For example, the logic flow 500 may include some or all of the operations to provide one-tap payment for transactions using a contactless card. Embodiments are not limited in this context.

As shown, the logic flow 500 begins at block 505, where the merchant server 150 generates a transaction identifier 116 for a transaction. As stated, the transaction identifier 116 may be any type of identifier, such as a unique alphanumeric identifier, a unique session alphanumeric identifier, a file, etc. At block 510, the merchant application 113 receives the transaction identifier 116 from the merchant server 150 via the network 130. The merchant application 113 and/or the one-tap module 114 may transmit the received transaction identifier 116 with the encrypted data 106 to the authentication server 120. At block 515, the merchant application 113 transmits indications of items and/or services added and/or removed from the user's shopping cart for the transaction associated with the transaction identifier 116. At block 520, the merchant server 150 receives the virtual card data 126, user information, and transaction identifier 116 from the VAN generator 142. At block 525, the merchant server processes payment for the transaction associated with the transaction identifier 116 by generating a transaction record in the transaction database 151.

Figure 6:
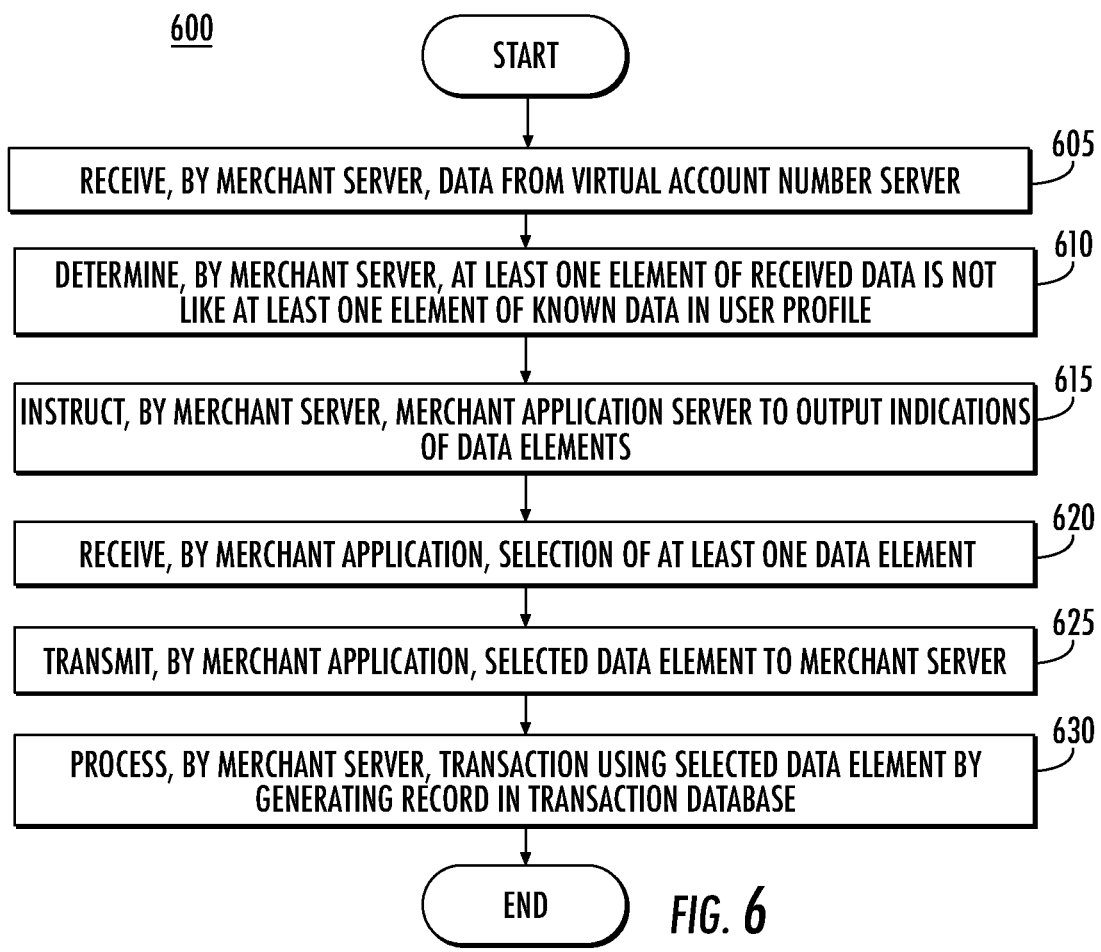
FIG. 6 illustrates an embodiment of a fourth logic flow.

FIG. 6 illustrates an embodiment of a logic flow 600. The logic flow 600 may be representative of some or all of the operations executed by one or more embodiments described herein. For example, the logic flow 600 may include some or all of the operations performed by the merchant application 113 and/or the merchant server 150. Embodiments are not limited in this context.

As shown, the logic flow 600 begins at block 605, where the merchant server 150 receives the virtual card data 126 (e.g., virtual account number, expiration date, and CVV), account holder data (e.g., name, billing address, shipping address, etc.), and transaction ID 116 from the VAN generator 142. At block 610, the merchant server 150 determines that at least one element of the received data is not like at least one element of user data in a user profile associated with the merchant. For example, the received mailing and/or billing addresses may not match any addresses specified in the user profile.

At block 615, the merchant server 150 instructs the merchant application 113 to output indications of the data elements identified at block 610. For example, the merchant application 113 may output a list of addresses. At block 620, the merchant application 113 receives a user selection of one of the data elements (e.g., a first address outputted at block 615). At block 625, the merchant application 113 transmits an indication of the data element selected at block 620 to the merchant server 150. At block 630, the merchant server 150 processes the transaction using the data received from the VAN generator 142 and the data element selected by the user at block 620. More specifically, the merchant server 150 generates a transaction record for the transaction in the transaction database 151.

Figure 7:
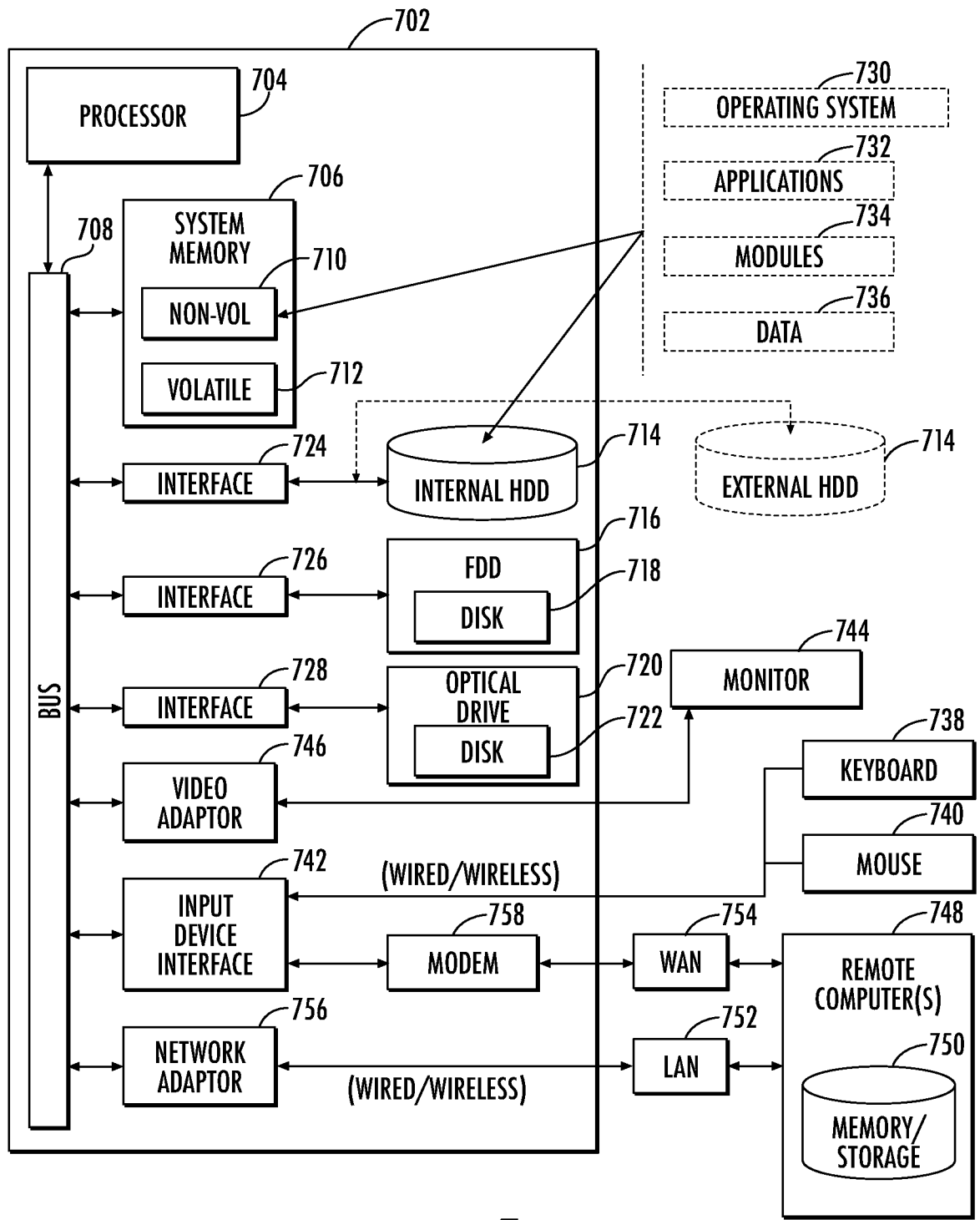
FIG. 7 illustrates an embodiment of a computing architecture.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In some embodiments, the computing architecture 700 may be representative, for example, of a system that implements one or more components of the system 100. In some embodiments, computing system 702 may be representative, for example, of the contactless card 101, mobile devices 110, authentication server 120, the virtual account number server 140, and/or the merchant server 150 of the system 100. The embodiments are not limited in this context. More generally, the computing architecture 700 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 702 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 704.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100, e.g., the applet 103, private keys 104, encrypted data 106, operating system 112, merchant applications 113, the one-tap module 114, the authentication application 123, the VAN generator 142, and/or the merchant server 150.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 752 and the WAN 754.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
   a plurality of processor circuits; and
   a memory storing instructions which when executed by one or more of the processor circuits, cause the one or more of the processor circuits to:
   output, by an application executing on a first processor circuit of the plurality of processor circuits, an indication specifying to tap a contactless card to complete a transaction initiated in the application, the transaction associated with a transaction identifier;
   receive, by the application from a communications interface of the contactless card, encrypted data generated by the contactless card based at least in part on a private key for the contactless card stored in a memory of the contactless card;
   transmit, by the application: (i) a merchant identifier of a merchant associated with the application, (ii) the transaction identifier, (iii) the encrypted data, and (iv) a location of a device comprising the first processor circuit to an authentication application executing on a second processor circuit of the plurality of processor circuits;
   verify, by the authentication application, the encrypted data by decrypting the encrypted data based at least in part on the private key for the contactless card;
   determine, by the authentication application, that the contactless card has previously been used to make a purchase with the merchant;
   determine, by the authentication application, that the location of the device is within a threshold distance of a known location, the known location to comprise at least one of a home location or a work location associated with the contactless card;
   generate, by a virtual account number generator executing on a third processor circuit of the plurality of processor circuits based on the verification of the encrypted data, the determination that the contactless card has previously been used to make a purchase with the merchant, and the determination that the device is within the threshold distance of the known location by the authentication application, a virtual account number;
   transmit, by the virtual account number generator, the merchant identifier, the transaction identifier, the virtual account number, an expiration date associated with the virtual account number, and a card verification value (CVV) associated with the virtual account number to a merchant server executing on a fourth processor circuit of the plurality of processor circuits, the merchant server associated with the merchant; and
   process, by the merchant server, the transaction using the transaction identifier, the virtual account number, the expiration date, and the CVV.

2. The system of claim 1, wherein the expiration date and the CVV comprise one or more of: (i) an expiration date and a CVV generated by the virtual account number generator, and (ii) an expiration date and a CVV of the contactless card received by the virtual account number generator from an account database, the memory storing instructions which when executed by one or more of the processor circuits, cause the one or more of the processor circuits to:
   receive, by the virtual account number generator from the account database, an account holder name of an account associated with the contactless card and an address associated with the account; and
   transmit, by the virtual account number generator, the account holder name and address to the merchant server, the merchant server further to process the transaction using the account holder name and address.

3. The system of claim 2, the memory storing instructions which when executed by one or more of the processor circuits, cause the one or more of the processor circuits to:
   generate, by the merchant server, a transaction record in a transaction database comprising the transaction identifier, the virtual account number, the expiration date, the CVV, the account holder name, the address, and at least one of an indication of a purchased product and an indication of a purchased service;
   transmit, by the merchant server to the application, an indication that the transaction was processed; and
   output, by the application, the indication that the transaction was processed on a display.

4. The system of claim 3, the memory storing instructions which when executed by one or more of the processor circuits, cause the one or more of the processor circuits to:

determine, by the merchant server, an address conflict based on the address being different than a known address specified in a user profile;

transmit, by the merchant server, the address and the known address to the application;

output, by the application on a display of the device, an indication of the address and the known address;

receive, by the application, selection of one of the address and the known address; and transmit, by the application, the selected one of the address and the known address to the merchant server to resolve the address conflict, the merchant server to process the transaction using the selected one of the address and the known address.

5. The system of claim 1, the memory storing instructions which when executed by one or more of the processor circuits, cause the one or more of the processor circuits to:

receive, by the application, authentication information for a user account associated with the contactless card, the authentication information comprising one or more of: (i) a username and a password, (ii) one or more biometric credentials; and transmit, by the application, the received authentication information to the authentication application, the authentication application to verify the authentication information.

6. The system of claim 1, wherein the communications interface of the contactless card is configured to support at least one of near field communication (NFC), Bluetooth, and Wi-Fi, the merchant server to process the transaction without receiving the virtual account number, the expiration date, the CVV, an account holder name, and an address from the application and without requiring a user of the application to provide authentication information to the application to authenticate with an account associated with the merchant, the memory storing instructions which when executed by one or more of the processor circuits, cause the one or more of the processor circuits to:

determine, by the authentication application, a device identifier received from the application is associated with a user account associated with the contactless card.

7. A method, comprising:

outputting, by an application executing on a processor circuit, an indication specifying to tap a contactless card to complete a transaction initiated in the application, the transaction associated with a transaction identifier;

receiving, by the application from a communications interface of the contactless card, encrypted data generated by the contactless card based at least in part on a private key for the contactless card stored in a memory of the contactless card;

transmitting, by the application: (i) a merchant identifier of a merchant associated with the application, (ii) the transaction identifier, (iii) the encrypted data, and (iv) a location of a device comprising the processor circuit to an authentication server;

verifying, by the authentication server, the encrypted data by decrypting the encrypted data based at least in part on the private key for the contactless card stored in a memory of the authentication server;

determining, by the authentication server, that the contactless card has previously been used to make a purchase with the merchant;

determining, by the authentication server, that the location of the device is within a threshold distance of a known location associated with the contactless card, the known location to comprise at least one of a home location or a work location associated with the contactless card;

generating, by a virtual account number server based on the verification of the encrypted data, the determination that the contactless card has previously been used to make a purchase with the merchant, and the determination that the device is within the threshold distance of the known location by the authentication server, a virtual account number;

transmitting, by the virtual account number server, the merchant identifier, the transaction identifier, the virtual account number, an expiration date associated with the virtual account number, and a card verification value (CVV) associated with the virtual account number to a merchant server associated with the merchant; and processing, by the merchant server, the transaction using the transaction identifier, the virtual account number, the expiration date, and the CVV.

8. The method of claim 7, wherein the expiration date and the CVV comprise one or more of: (i) an expiration date and a CVV generated by the virtual account number server, and (ii) an expiration date and a CVV of the contactless card received by the virtual account number server from an account database, the method further comprising:

receiving, by the virtual account number server from the account database, an account holder name of an account associated with the contactless card and an address associated with the account; and transmitting, by the virtual account number server, the account holder name and address to the merchant server, the merchant server further to process the transaction using the account holder name and address.

9. The method of claim 8, further comprising:

generating, by the merchant server, a transaction record in a transaction database comprising the transaction identifier, the virtual account number, the expiration date, the CVV, the account holder name, the address, and at least one of an indication of a purchased product and an indication of a purchased service;

transmitting, by the merchant server to the application, an indication that the transaction was processed; and outputting, by the application, the indication that the transaction was processed on a display.

10. The method of claim 9, further comprising:

determining, by the merchant server, an address conflict based on the address being different than a known address specified in a user profile;

transmitting, by the merchant server, the address and the known address to the application;

outputting, by the application on a display, an indication of the address and the known address;

receiving, by the application, selection of one of the address and the known address; and transmitting, by the application, the selected one of the address and the known address to the merchant server, the merchant server to process the transaction using the selected one of the address and the known address.

11. The method of claim 10, further comprising:

receiving, by the application, authentication information for a user account associated with the contactless card, the authentication information comprising one or more of: (i) a username and a password, (ii) one or more biometric credentials; and transmitting, by the application, the received authentication information to the authentication server, the authentication server to verify the authentication information.

12. The method of claim 11, wherein the communications interface of the contactless card is configured to support at least one of near field communication (NFC), Bluetooth, and Wi-Fi, the merchant server to process the transaction without receiving the virtual account number and without requiring a user of the application to provide authentication information to the application to authenticate with an account associated with the merchant, the expiration date, the CVV, an account holder name, and an address from the application, the method further comprising:

determining, by the authentication server, a device identifier received from the application is associated with a user account associated with the contactless card.

13. A non-transitory computer-readable storage medium having computer-readable program code embodied therewith, the computer-readable program code executable by one or more processor circuits of a plurality of processor circuits to:

output, by an application executing on a first processor circuit of the plurality of processor circuits, an indication specifying to tap a contactless card to complete a transaction initiated in the application, the transaction associated with a transaction identifier;

receive, by the application from a communications interface of the contactless card, encrypted data generated by the contactless card based at least in part on a private key for the contactless card stored in a memory of the contactless card;

transmit, by the application: (i) a merchant identifier of a merchant associated with the application, (ii) the transaction identifier, (iii) the encrypted data, and (iv) a location of a device comprising the first processor circuit to an authentication application executing on a second processor circuit of the plurality of processor circuits;

verify, by the authentication application, the encrypted data by decrypting the encrypted data based at least in part on the private key for the contactless card;

determine, by the authentication application, that the contactless card has previously been used to make a purchase with the merchant;

determine, by the authentication application, that the location of the device is within a threshold distance of a known location, the known location to comprise at least one of a home location or a work location associated with the contactless card;

generate, by a virtual account number generator executing on a third processor circuit of the plurality of processor circuits based on the verification of the encrypted data, the determination that the contactless card has previously been used to make a purchase with the merchant, and the determination that the device is within the threshold distance of the known location by the authentication application, a virtual account number;

transmit, by the virtual account number generator, the merchant identifier, the transaction identifier, the virtual account number, an expiration date associated with the virtual account number, and a card verification value (CVV) associated with the virtual account number to a merchant server executing on a fourth processor circuit of the plurality of processor circuits, the merchant server associated with the merchant; and process, by the merchant server, the transaction using the transaction identifier, the virtual account number, the expiration date, and the CVV.

14. The non-transitory computer-readable storage medium of claim 13, wherein the expiration date and the CVV comprise one or more of: (i) an expiration date and a CVV generated by the virtual account number generator, and (ii) an expiration date and a CVV of the contactless card received by the virtual account number generator from an account database, further comprising computer-readable program code executable by one or more of the processor circuits to:

receive, by the virtual account number generator from the account database, an account holder name of an account associated with the contactless card and an address associated with the account; and transmit, by the virtual account number generator, the account holder name and address to the merchant server, the merchant server further to process the transaction using the account holder name and address.

15. The non-transitory computer-readable storage medium of claim 14, further comprising computer-readable program code executable by one or more of the processor circuits to:

generate, by the merchant server, a transaction record in a transaction database comprising the transaction identifier, the virtual account number, the expiration date, the CVV, the account holder name, the address, and at least one of an indication of a purchased product and an indication of a purchased service;

transmit, by the merchant server to the application, an indication that the transaction was processed; and output, by the application, the indication that the transaction was processed on a display.

16. The non-transitory computer-readable storage medium of claim 15, further comprising computer-readable program code executable by one or more of the processor circuits to:

determine, by the merchant server, an address conflict based on the address is being different than a known address specified in a user profile;

transmit, by the merchant server, the address and the known address to the application;

output, by the application on a display of the device, an indication of the address and the known address;

receive, by the application, selection of one of the address and the known address; and transmit, by the application, the selected one of the address and the known address to the merchant server to resolve the address conflict, the merchant server to process the transaction using the selected one of the address and the known address.

17. The non-transitory computer-readable storage medium of claim 16, further comprising computer-readable program code executable by one or more of the processor circuits to:

receive, by the application, authentication information for a user account associated with the merchant, the authentication information comprising one or more of: (i) a username and a password, (ii) one or more biometric credentials.

18. The non-transitory computer-readable storage medium of claim 17, wherein the communications interface of the contactless card is configured to support at least one of near field communication (NFC), Bluetooth, and Wi-Fi, further comprising computer-readable program code executable by one or more of the processor circuits to:
    transmit, by the application, the received authentication information to the authentication application, the authentication application to verify the authentication information.

* * * * *